(12) United States Patent
Evans et al.

(10) Patent No.: US 8,535,039 B2
(45) Date of Patent: Sep. 17, 2013

(54) BLUNT EDGE DOUGH CUTTER

(75) Inventors: James R. Evans, Apple Valley, MN (US); James W. Finkowski, Andover, MN (US); Gene A. Russel, Joplin, MO (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 13/011,519

(22) Filed: Jan. 21, 2011

(65) Prior Publication Data

US 2011/0177190 A1 Jul. 21, 2011

Related U.S. Application Data

(62) Division of application No. 10/424,340, filed on Apr. 28, 2003, which is a division of application No. 09/241,508, filed on Feb. 1, 1999, now Pat. No. 6,902,754.

(51) Int. Cl.
*A21C 11/04* (2006.01)
*A21C 11/10* (2006.01)

(52) U.S. Cl.
USPC ........... 425/316; 425/281; 425/294; 425/298; 425/307; 425/313; 426/503; 426/518

(58) Field of Classification Search
CPC ............................... A21C 11/04; A21C 11/10
USPC ................ 425/202, 232, 235, 281, 294, 296, 425/298, 299, 302.1, 304, 306, 307, 308, 425/313, 316; 426/518, 503
See application file for complete search history.

(56) References Cited

U.S. PATENT DOCUMENTS

| | | | |
|---|---|---|---|
| 661,999 | A | 11/1900 | Kessler |
| D45,900 | S | 6/1914 | Ward |
| 1,098,552 | A | 6/1914 | Bierer |
| 1,144,953 | A | 6/1915 | Ward |
| 1,728,702 | A | 7/1929 | Smith |
| 1,841,495 | A | 1/1932 | Mears |
| 1,847,150 | A | 3/1932 | Ward et al. |
| 1,871,755 | A | 8/1932 | Smith |
| 1,945,755 | A | 2/1934 | Scruggs, Jr. |
| 2,144,720 | A | 1/1939 | Gibson |
| 2,230,778 | A | 2/1941 | Flores |

(Continued)

FOREIGN PATENT DOCUMENTS

| | | |
|---|---|---|
| CA | 1143220 | 3/1983 |
| DE | 827183 | 1/1952 |

(Continued)

OTHER PUBLICATIONS

"The High Speed Biscuit Line", Manual, 64 pages.

(Continued)

*Primary Examiner* — Seyed Masoud Malekzadeh
(74) *Attorney, Agent, or Firm* — Everett G. Diederiks, Jr.; John L. Crimmins; Mark W. Binder

(57) ABSTRACT

A dough cutting apparatus is suitable for cutting a sheet of dough. The dough cutting apparatus includes a structure defining a blunt dough engaging portion. The present invention can be embodied in a number of different ways, including a wheel cutter, a rotary drum cutter, a reciprocating head cutter, or another cutter.

11 Claims, 7 Drawing Sheets

(56) References Cited

U.S. PATENT DOCUMENTS

| | | | | |
|---|---|---|---|---|
| 2,346,839 A | | 4/1944 | Harriss et al. | |
| 2,434,339 A | * | 1/1948 | Conie | 118/13 |
| 2,454,316 A | * | 11/1948 | Haecks | 83/102 |
| 2,618,227 A | | 11/1952 | Schmittroth | |
| 2,681,625 A | | 6/1954 | Babbitt | |
| 2,887,964 A | | 5/1959 | Griner | |
| 2,999,314 A | | 9/1961 | Reichlein | |
| 3,154,986 A | | 11/1964 | Reid | |
| 3,225,718 A | | 12/1965 | Page | |
| 3,234,895 A | | 2/1966 | Leiby | |
| 3,279,927 A | | 10/1966 | Reid | |
| 3,427,783 A | | 2/1969 | Reid | |
| 3,570,066 A | * | 3/1971 | Neifeld et al. | 425/315 |
| 3,595,111 A | | 7/1971 | Hershberger | |
| 3,744,404 A | * | 7/1973 | Eisendrath et al. | 99/450.1 |
| 3,872,757 A | | 3/1975 | Hargadon | |
| 4,045,151 A | * | 8/1977 | Zazzara | 425/297 |
| 4,276,800 A | | 7/1981 | Koppa et al. | |
| 4,511,586 A | * | 4/1985 | Fitzwater et al. | 426/144 |
| 4,534,726 A | | 8/1985 | Simelunas | |
| 4,543,053 A | | 9/1985 | Jasniewski | |
| 4,578,027 A | | 3/1986 | Koppa et al. | |
| 4,608,918 A | | 9/1986 | Funabashi et al. | |
| 4,664,928 A | | 5/1987 | McCaffrey | |
| 4,671,759 A | | 6/1987 | Hayashi et al. | |
| 4,689,236 A | * | 8/1987 | Pinto | 426/502 |
| 4,692,109 A | * | 9/1987 | Hayashi et al. | 425/308 |
| 4,719,117 A | | 1/1988 | Simelunas | |
| 4,732,083 A | * | 3/1988 | Arter et al. | 101/28 |
| 4,789,555 A | | 12/1988 | Judd | |
| 4,792,299 A | | 12/1988 | McCaffrey | |
| 4,808,104 A | | 2/1989 | D'Orlando | |
| 4,818,207 A | | 4/1989 | Heron | |
| 4,882,185 A | | 11/1989 | Simelunas et al. | |
| 4,995,803 A | * | 2/1991 | Champalaune et al. | 425/190 |
| 5,022,843 A | | 6/1991 | Secondiak | |
| 5,059,111 A | * | 10/1991 | Mossinger et al. | 425/294 |
| 5,162,119 A | * | 11/1992 | Pappas et al. | 425/92 |
| 5,180,593 A | * | 1/1993 | Mistretta et al. | 425/202 |
| 5,186,959 A | * | 2/1993 | Tanaka | 425/215 |
| 5,204,125 A | | 4/1993 | Larsen | |
| 5,240,731 A | * | 8/1993 | Bornhorst et al. | 426/549 |
| D345,043 S | | 3/1994 | Dayley | |
| 5,342,188 A | * | 8/1994 | Zimmermann | 425/235 |
| 5,375,509 A | | 12/1994 | Taylor et al. | |
| 5,388,489 A | | 2/1995 | Dayley | |
| 5,498,433 A | * | 3/1996 | Ouellette | 426/502 |
| 5,529,799 A | * | 6/1996 | Bornhorst et al. | 426/549 |
| 5,535,575 A | | 7/1996 | Finkowski et al. | |
| 5,540,140 A | | 7/1996 | Rubio et al. | |
| 5,580,583 A | * | 12/1996 | Caridis et al. | 425/142 |
| 5,622,742 A | | 4/1997 | Carollo | |
| 5,687,638 A | | 11/1997 | Makowecki | |
| 5,750,170 A | * | 5/1998 | Daouse et al. | 426/283 |
| 5,879,722 A | * | 3/1999 | Andersen et al. | 156/501 |
| 6,004,612 A | * | 12/1999 | Andreski et al. | 426/618 |
| 6,120,827 A | | 9/2000 | Rocca | |
| 6,168,817 B1 | * | 1/2001 | Pavan | 426/503 |
| 6,530,771 B1 | * | 3/2003 | Clark | 425/194 |
| 6,902,754 B1 | | 6/2005 | Evans et al. | |
| 7,156,007 B1 | * | 1/2007 | Albin et al. | 83/302 |
| 2004/0013770 A1 | | 1/2004 | Evans et al. | |

FOREIGN PATENT DOCUMENTS

| | | | |
|---|---|---|---|
| DE | 2340025 | * | 2/1974 |
| DE | 3410162 | | 9/1974 |
| DE | 3332061 | | 3/1985 |
| EP | 0 130 772 | | 1/1985 |
| EP | 0 841 009 | | 5/1998 |
| FR | 2195892 | | 3/1974 |
| FR | 2643229 | | 8/1990 |

OTHER PUBLICATIONS

Modular bakery Systems, "Random dough Imprinter", Brochure, LeMatic, Inc., 2 pages.

Gemini Bakery Equipement Co., "We're With You From Beginning to End", Brochure, 2 pages.

Vajra Equipment & consulting, Inc., "Professional Machinery for Food Industry", Brochure, 4 pages.

Rademaker B.V., "Make Up Lines the Most Versatile Approach", Booklet, 26 pages.

The Moline Company, A Division of Pillsbury Company, Moline Bulletin 529, "Round Cutters" p. 1, printed in USA at least prior to 1991.

* cited by examiner

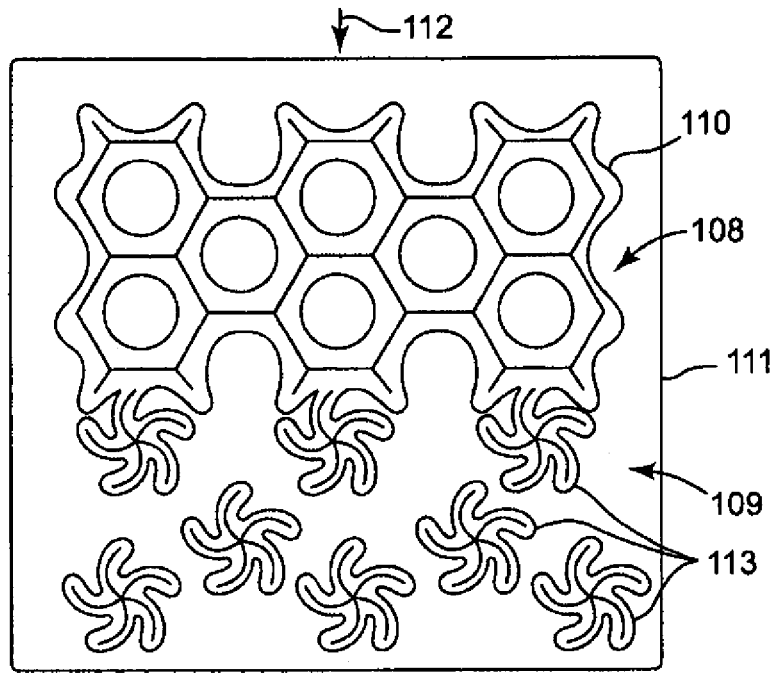
Fig. 11B
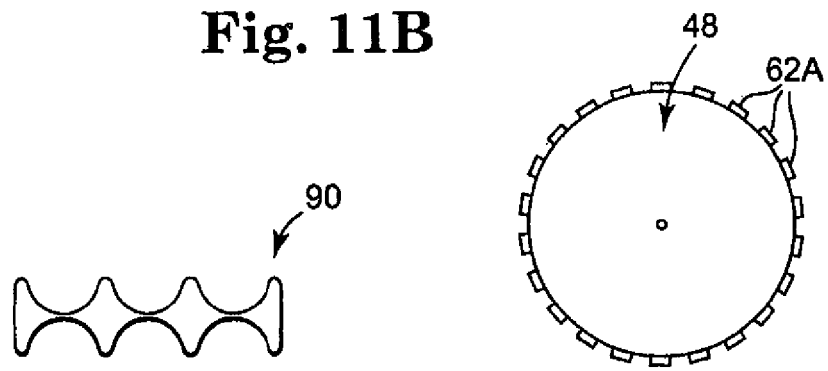
Fig. 10E
Fig. 8H
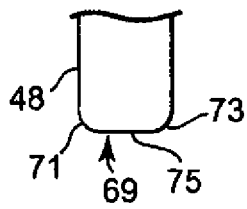
Fig. 8E
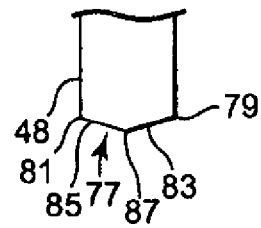
Fig. 8G
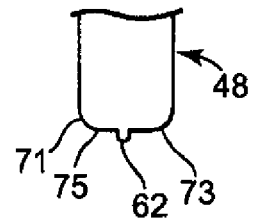
Fig. 8F

BLUNT EDGE DOUGH CUTTER

This application is a Divisional of application Ser. No. 10/424,340, filed Apr. 28, 2003, which is a divisional of application Ser. No. 09/241,508, filed Feb. 1, 1999, now issued U.S. Pat. No. 6,902,754. The entire contents of each of these applications are hereby incorporated by reference.

BACKGROUND OF THE INVENTION

The present invention deals with a dough cutter. More specifically, the present invention deals with a dough cutter used to make bread products having aesthetically pleasing appearances.

A number of methods have been employed in order to make various types of bread products, such as loaves, buns, rolls, biscuits, and breadsticks, from a sheet of dough. In such systems, a sheet of bread dough may typically be extruded, reduced, and provided to a conveyor which conveys the sheet of dough along a dough travel path. The sheet of dough then encounters one or more cutting apparatus, such as slitter wheels, guillotine-type cutters, reciprocating head cutters, or rotatable drum-type cutters. Such cutters, traditionally, have employed very thin or sharp cutting edges in order to cut the dough. For instance, many such cutting edges are only approximately 1/32 of an inch thick. In fact, conventional wisdom dictates that, when cutting dough, without crimping or performing other types of dough forming functions, the thinner the cutting edge is the better. This requires less cutting pressure and results in less dough displacement from the cut.

However, such cuts can render aesthetically unpleasing dough pieces. For example, rather than resulting in a breadstick or bun which has rounded corners which resemble hand made buns, the cut bun has sharp and squared off edges which can be aesthetically undesirable.

In order to obtain a more rounded look, prior systems have divided or cut the dough sheet with dividers or sharp cutters, as described above, and then subjected the cut dough pieces to a subsequent rolling process by which the dough pieces are rolled to resemble a hand-formed dough piece.

Still other prior techniques do not even attempt to process a dough sheet into such rounded dough pieces. Instead, typical dinner roll making techniques parse dough into dough portions which are placed in molds or rollers which round the dough into balls. Those balls are then baked into the eventual rolls. Also, some bread making techniques parse dough into pieces which are allowed to rest, are sheeted and rolled, subjected to pressure by a pressure board and placed in a pan. Such techniques are quite slow.

SUMMARY OF THE INVENTION

A dough cutting apparatus is suitable for cutting a sheet of dough. The dough cutting apparatus includes a structure defining a blunt dough engaging portion. The present invention can be embodied in a number of different ways, including a wheel cutter, a rotary drum cutter, a reciprocating head cutter, or another type of cutter.

BRIEF DESCRIPTION OF THE DRAWINGS

FIGS. 8A-8H illustrate additional embodiments of dough cutters in accordance with the present invention.

FIGS. 10A-10E illustrate utilizing the present invention to cut a set of buns or loaves in accordance with one aspect of the present invention.

FIG. 11B illustrates the cutter shown in FIG. 11A with a pattern imprinter portion.

DETAILED DESCRIPTION OF THE PREFERRED EMBODIMENTS

Figure 1:
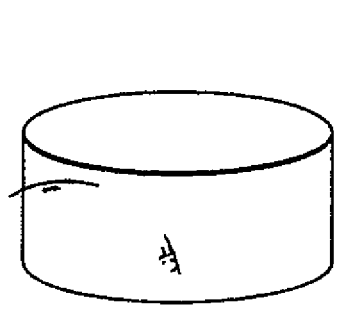
FIG. 1 illustrates an elevated side view of a dinner roll cut using a prior art dough cutter.

FIG. 1 illustrates a dinner roll 10 cut using a method and cutter in accordance with the prior art. It can be seen that dinner roll 10 has sharp, substantially squared off corners, where it was cut from a sheet, or another piece, of dough.

Figure 2:
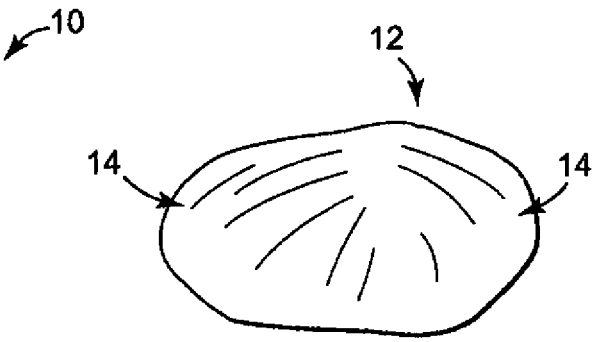
FIG. 2 illustrates an elevated side view of a bun or dinner roll cut in accordance with the present invention.

By contrast, FIG. 2 illustrates a bun or roll 12 which is cut using a cutter or system in accordance with one aspect of the present invention. It can be seen that roll 12 has rounded edges 14, rather than the squared or sharply cut edges of roll 10 illustrated in FIG. 1.

In the past, this type of shape has been obtained by placing small balls of dough in rollers which roll the balls of dough into a substantially spherical shape. The dough spheres (or dough balls) are then placed in individual baking pans so that they can be baked, much as a conventional dinner roll is baked by a consumer. However, such techniques are very low throughput techniques. They are, thus, less than desirable for commercial applications in which it is desirable to process many pounds of dough per minute.

Figure 3:
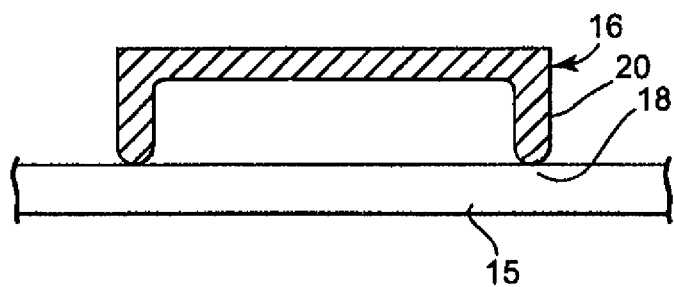
FIG. 3 illustrates a dinner roll cutter in accordance with one aspect of the present invention.

FIG. 3 illustrates a sheet of bread dough 15 and a cross-section of a cutter 16 in accordance with one aspect of the present invention. By using the term bread dough, the present discussion refers to a dough which can be rather sticky, to a dough which is rather dry and which falls in a range of approximately 600 BUs to approximately 1200 BUs. In the embodiment illustrated in FIG. 3, cutter 16 is substantially round in shape. However, it will be appreciated that cutter 16 can take substantially any shape, and still maintain inventive aspects of the present invention.

Dough cutter 16 has a cutting portion 18, which engages, and cuts, dough sheet 15. Cutting portion 18, in the embodiment illustrated in FIG. 3, is rounded or blunt. Blunt cutting portion 18, in one preferred embodiment, has a radius of curvature of at least approximately 1/8-1/4 inch. Blunt portion 18 is formed about the bottom of annular ring 20, which defines the cutting depth of cutter 16. The thickness of annular ring 20, in another preferred embodiment, is at least approximately ¼ inch. More preferably, the thickness of annular ring 20 is in a range of approximately ¼-½ inch.

Figure 4:
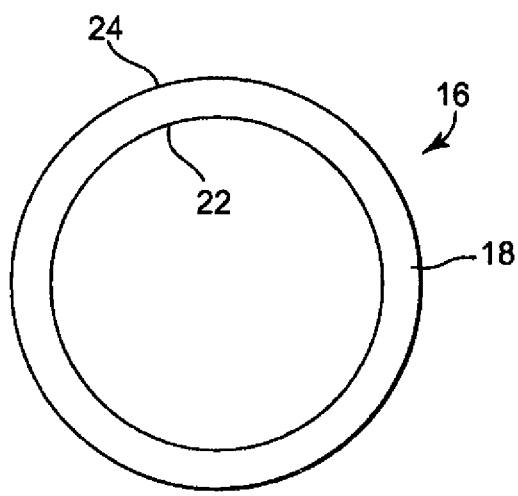
FIG. 4 is a bottom plan view of the dinner roll cutter shown in FIG. 3.

FIG. 4 is a bottom plan view of cutter 16 illustrated in FIG. 3. FIG. 3 simply illustrates that, in the embodiment illustrated in FIGS. 3 and 4, cutter 16 has a substantially similarly shaped inner edge 22 and outer edge 24.

Figure 5:
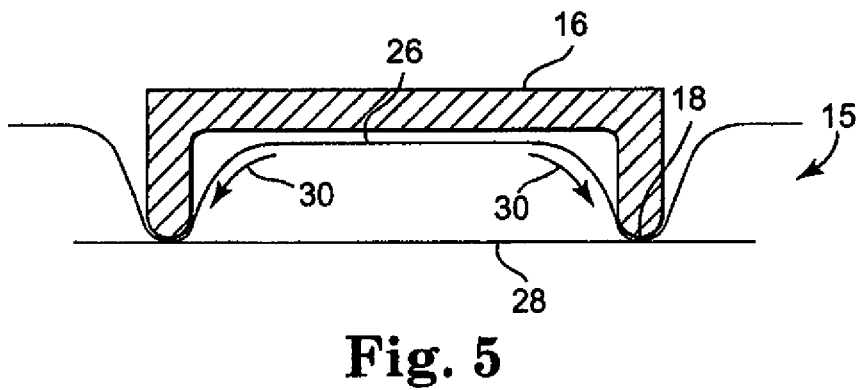
FIG. 5 illustrates a cutting operation using the dinner roll cutter shown in FIGS. 3 and 4.

FIG. 5 illustrates use of dough cutter 16 in cutting dough sheet 15. As will be described in greater detail later in the application, cutter 16 can be mounted to one of any number of different types of cutting mechanisms which either press cutter 16 onto dough sheet 15, or cause dough sheet 15 to be pressed into cutter 16. In either case, cutting portion 18 of cutter 16 engages a surface 26 of dough sheet 15. In the embodiment illustrated in FIG. 5, cutter 16 is pressed against upper surface 26 of dough sheet 15, toward lower surface 28 of dough sheet 15. As cutter 16 is depressed against the dough sheet, cutting portion 18 begins to make an impression in the upper surface 26 of dough sheet 15.

In accordance with one aspect of the present invention, cutting portion 18 is wide enough such that frictional engagement between the upper surface 26 of dough sheet 15 and cutting portion 18 acts to draw, or pull, the top surface 26 of dough sheet 15 downwardly, as indicated by arrows 30, toward the bottom surface 28. The pressure exerted by cutting portion 18 also acts to seal top surface 26 of dough sheet 15 to bottom surface 28. This results in a more rounded cut dough product 12, as indicated in FIG. 2. Thus, rather than having its edges straight and substantially squared off (such as the prior art roll illustrated in FIG. 1), roll (or dough product) 12 illustrated in FIG. 2 has substantially rounded edges, which are formed by the upper surface 26 of dough sheet is being pulled toward the bottom surface 28 of dough sheet 15, and sealed thereto, when dough sheet 15 is severed by cutting portion 18 of cutter 16. Thus, when roll 12 is baked, it has an aesthetically more desirable look, which more closely resembles a handmade dinner roll, than prior art dinner rolls which were cut from a dough sheet.

Figure 6A:
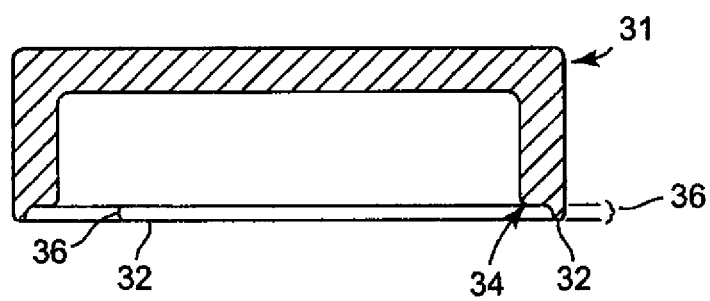
FIGS. 6A and 6B illustrate another embodiment of a dough cutter in accordance with one aspect of the present invention.
Figure 6B:
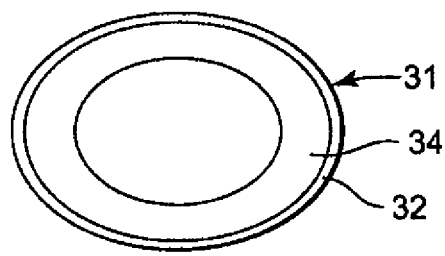

FIGS. 6A and 6B are a side sectional view, and a bottom plan view, respectively, of another embodiment of a cutter 31 in accordance with the present invention illustrated without dough. Cutter 31 is similar to cutter 16 illustrated in previous figures. Cutter 31 has a dough engaging, cutting portion 34, which is relatively thick, or blunt, as compared to prior art cutters. In accordance with one aspect of the present invention, cutting portion 34 has an inner rounded dough engaging portion which is rounded to a radius of curvature of at least approximately ⅛ inch. More preferably, the radius of curvature is in a range of approximately ⅛-¼ inch. In addition, the annular ring which forms the depth of cutter 31 may be in a range of approximately ¼-½ inch thick.

Figure 11A:
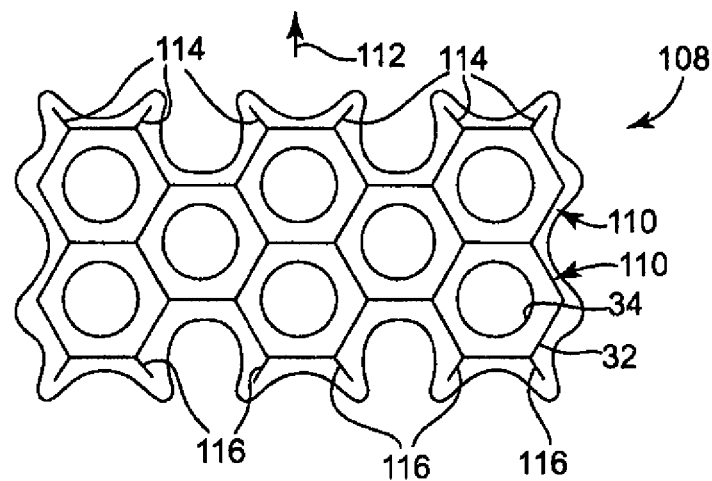
FIG. 11A illustrates a hex cutter in accordance with one aspect of the present invention.
Figure 11C:
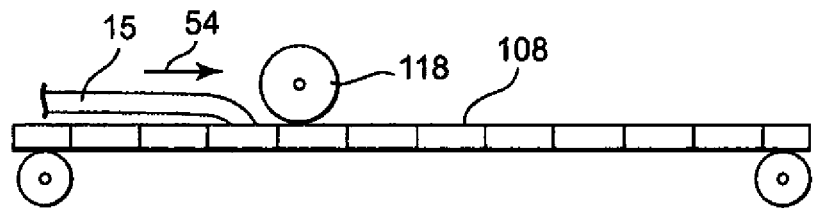
FIG. 11C illustrates a compression roller and cutter bar arrangement in accordance with one aspect of the present invention.

However, cutter 31 also has an additional cutting edge 32. Edge 32, in the embodiment illustrated in FIGS. 6A and 6B, forms an annular ring generally disposed about the outer periphery of cutter 31, and is much narrower than the remainder of the annular ring which forms the depth of cutter 31. In one illustrative embodiment, cutting edge 32 is only approximately 1/16 of an inch, or less, in thickness. Cutting edge 32 protrudes from dough engaging portion 34 by a distance 36 which, in one illustrative embodiment, is approximately 1/16 of an inch or less. If used only as a single cutter, or if used on a cutting head (such as illustrated in FIGS. 11A-11C discussed below) the thickness of blunt dough engaging portion 34 can be rounded to approximately ⅛ inch radius of curvature such that the overall thickness of portion 34 and edge 32 is approximately 3/16 of an inch. Cutting edge 32 can be a flat edge, or it can be sharpened or tapered. Therefore, cutting edge 32 actually severs dough sheet 15, while dough engaging portion 34, which is relieved from the cutting edge 32, provides a blunt dough engaging surface which is sufficiently thick to frictionally engage, and pull, the top surface 26 of dough sheet 15 toward the bottom surface 28 thereof, and to seal the two together (or pinch them together with possibly only a small gap between the two caused by edge 32), in order to provide the eventual rounded dough product. Since cutting edge 32 is provided, the cutting pressure required to cut through, or sever, dough sheet 15 has been observed to be less than that required for a cutter (such as cutter 16 illustrated in the previous figures) which has no such cutting edge.

Figure 7A:
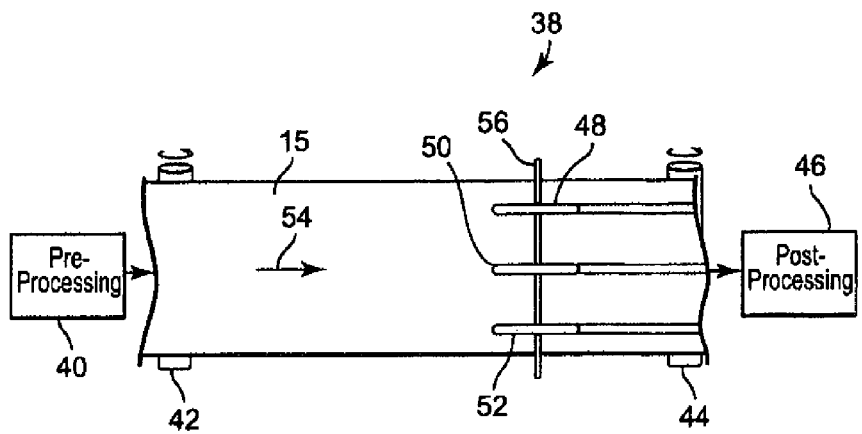
FIGS. 7A and 7B illustrate another embodiment of a dough cutter in accordance with the present invention.
Figure 7B:
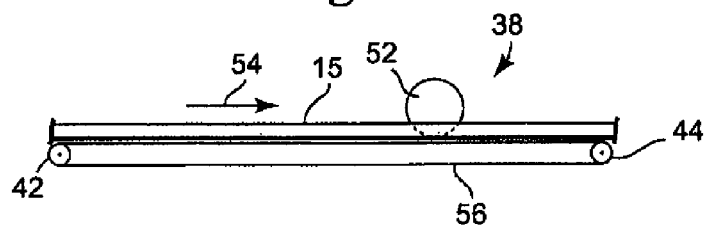

FIGS. 7A and 7B illustrate a system 38 in which the present invention is embodied in a different type of cutter. FIG. 7A shows a preprocessing station 40, dough sheet 15 conveyed on a conveyor which is driven by at least one of rollers 42 and 44, a post processing station 46, and a plurality of rotatable wheel (or slitter wheel) cutters, 48, 50 and 52.

Preprocessing station 40 simply illustrates that dough sheet 15 may typically be extruded, reduced, or processed in some other manner and provided to the conveyor carried by rollers 42 and 44 in the direction indicated by arrow 54.

Cutters 48, 50 and 52 are rotatably mounted relative to the conveyor, preferably about an axle 56. Cutters 48, 50 and 52 each have an outer diameter which is preferably at least six times as large as the thickness of the dough, and even more preferably is at least 10-12 times as large or more. Cutters 48, 50 and 52 are mounted relative to the conveyor such that, when dough sheet 15 is traveling in the direction indicated by arrow 54, cutters 48, 50 and 52 engage the dough sheet and sever it, to provide a plurality of cuts in dough sheet 15. Cutters 48, 50 and 52, can either be positively driven, or simply driven by the frictional engagement between the cutters and dough sheet 15 or the conveyor. After the cuts are made in dough sheet 15, dough sheet 15 continues traveling in the direction indicated by arrow 54 to post processing station 46. Post processing station 46 can include, for example, cutting, proofing, baking, freezing, and/or packaging.

FIG. 7B is a side view of a portion of system 38 shown in FIG. 7A, and similar items are similarly numbered. FIG. 7B better illustrates conveyor 56 which is driven by rollers 42 and/or 44. In addition, FIG. 7B illustrates that cutters 48, 50 and 52 extend all the way through dough sheet 15 to lightly engage conveyor (not labeled) and thereby completely sever dough sheet 15.

Figures 8A, 8B, 8C, 8D:
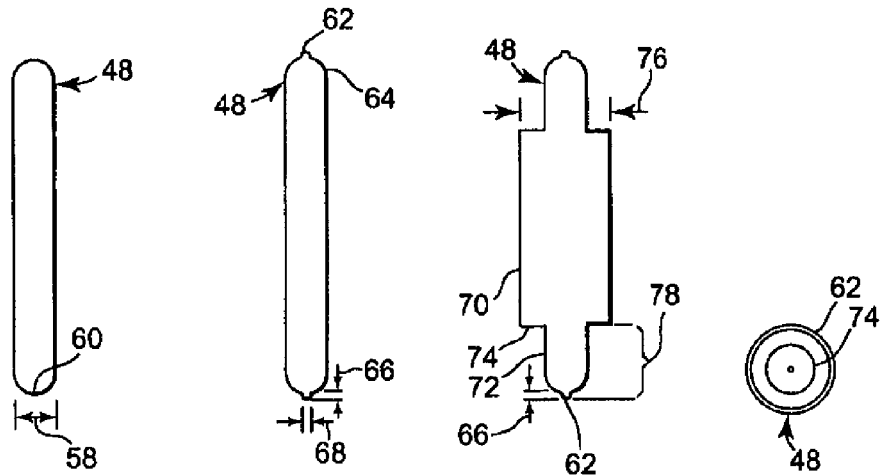

FIGS. 8A-8H illustrate different embodiments of cutters 48, 50 and 52. For the purposes of simplicity, each of the wheels is designated as cutter 48. However, it will be appreciated that the wheels can be positioned substantially anywhere along dough sheet is. FIG. 8A illustrates that cutter 48 simply has a rounded or blunt outer periphery which has a thickness 58 which is preferably in a range of approximately ¼-½ inch. Similarly, the blunt outer periphery of cutter 48 is rounded to a radius of curvature preferably in a range of ⅛-¼ inch. With such an arrangement, the outer periphery of cutter 48, as it cuts dough sheet 15, performs a similar action to cutter 16 illustrated in FIG. 5. In other words, cutter 48 frictionally engages the upper surface of dough sheet 15 and pulls or draws it downwardly toward the lower surface of dough sheet 15, thus sealing the two together and severing or cutting the dough sheet.

FIG. 8B illustrates an embodiment of cutter 48 similar to that shown in FIG. 8A, and similar items are similarly numbered. However, FIG. 8B illustrates that the outer periphery of cutter 48 is provided with a narrow cutting edge 62 which is similar to cutting edge 32 in FIGS. 6A and 6B. FIG. 8B also illustrates that cutter 48 has a dough engaging portion 64, which is blunt, and which is roughly ¼-½ inch thick and is preferably rounded with a radius of curvature of ⅛-¼ inch. Dough engaging portion 64 is preferably relieved from the outer periphery of cutting edge 62 by a distance 66 which is no greater than approximately 1/16 of an inch. Similarly, cutting edge 62 preferably has a thickness 68 which is on the order of approximately 1/16 of an inch or less and may be a flat edge or tapered to a sharpened edge.

Cutter 48, as illustrated in FIG. 8B, thus cuts dough sheet 15 in a similar manner to cutter 31 illustrated in FIG. 6A. Cutting edge 62 provides a sharper edge such that the cutting force which needs to be applied to dough sheet 15 is significantly less than that with respect to the embodiment illustrated in FIG. 8A. However, since dough engaging portion 64 is provided, and is only relieved from the cutting edge 62 by a short distance, cutter 48, as illustrated in FIG. 8B, maintains the benefit of a more rounded type cut than if the entire cutter were formed of the same thickness as cutting edge 62.

FIGS. 8C and 8D illustrate yet another embodiment of cutter 48 in accordance with one aspect of the present invention. The cutter 48 illustrated in FIG. 8C is similar in many respects to that illustrated in FIG. 8B, and similar items are similarly numbered. However, cutter 48 of FIG. 8C also has a thicker portion 70 which is radially disposed toward the center of cutter 48. In one embodiment, portion 70 is offset from a radial outer portion 72 by a transition region 74 which comprises either a step (as shown in FIG. BC) or a taper, or another transition configuration. The more central portion 70 of cutter 48 has a thickness 76 which is greater than approximately ½ inch. Similarly, portion 70 is relieved from cutting edge 62 by a distance 78 which is at least as great as the thickness of dough sheet 15. Therefore, central portion 70 provides greater structural support to cutter 48 than the embodiment illustrated in FIG. 8B. However, cutter 48 illustrated in FIG. 8C obtains the advantages associated with cutter 48 as illustrated in FIG. 8B. FIG. 8D is simply a side view of the cutter 48 illustrated in FIG. BC, and better illustrates one exemplary location of the transition section 74.

FIGS. 8E-8G illustrate further embodiments of cutter 48, the features of which can be applied to other types of cutters such as those shown in the other figures. FIG. 8E shows that cutter 48 has a dough engaging portion 69 which has rounded corners 71 and 73 but which has a generally flattened region 75 there between. Corners 71 and 73 are rounded sufficiently to avoid breaking the skin on the upper surface of dough sheet 16 until the upper skin has been stretched and drawn toward the lower skin and pinched thereto. The faster dough sheet 15 moves, the more likely cutter 48 is to break the skin, so the more blunt or rounded the corners should be.

FIG. 8F shows cutter 48 which is similar to cutter 48 in FIG. 8E and similar items are similarly numbered. Cutter 48 shown in FIG. 8F includes corners 71 and 73 and flattened portion 75. However, flattened portion 75 also has raised edge 62, which is similar to that illustrated in FIGS. 8B-8D. Therefore, cutter 48 illustrated in FIG. 8F can obtain the same advantages as cutter 48 illustrated in FIG. 8E, but with less cutting pressure required to sever dough sheet 15.

FIG. 8G illustrates cutter 48 with a lower portion 77. Lower portion 77 includes corners 79 and 81, which can either be rounded or sharp, and which lead to tapering portions 83 and 85. Tapering portions 83 and 85 taper to a most extreme outer peripheral edge 87 of cutter 48. The angle defined by tapering portions 83 and 85 is a relatively large angle, and is sufficient such that the extreme outer periphery 87 avoids breaking the skin of dough sheet 51, until that skin has been drawn toward the opposite skin, and pinched or sealed thereto. Similarly, corners 79 and 81 are preferably rounded, but are at least formed at angles which are sufficiently large to avoid breaking the dough skin which it engages, until it is pinched or sealed to the opposite dough skin.

FIG. 8H illustrates yet another cutter 48. Cutter 48 illustrated in FIG. 8H is similar to that illustrated in FIG. 8F. However, ridge 62 is replaced by a plurality of ridge section 62A. Ridge sections 62A are sized and dimensioned similarly to ridge 62, except that they are discontinuous along the outer periphery of cutter 48. Ridge sections 62A thus provide a perforation, rather than a clean cut or sever. Such a cutter can be used for any desirable application, and may specifically be used as any of cutters 92-98 for the application illustrated in FIGS. 10A-10D, as will be described later in the specification.

It occasionally happens that, when fairly thick dough (such as dough in excess of 1 inch thick) is to be cut by rollers (such as with system 38 illustrated in FIG. 7A) the dough sheet 15 can tend to gather, or bunch, upstream of the wheels, particularly when the wheels are not mechanically driven.

Based on the above, it should be readily apparent that, at least in accordance with certain aspects of the invention, the dough cutting wheel includes a dough engaging surface portion at a central outer circumference thereof that is radially offset from the dough engaging curved surfaces that are provided to both sides thereof so as to cut dough of the first and second skins of the dough sheet as pinched together by the dough engaging curved surfaces. In addition, the dough engaging surface portion at the central outer circumference, at least in accordance with certain embodiments, is radially offset by an amount that is no more than one half of the radius for each of the dough engaging curved surfaces. In addition to longitudinal cutting, transverse cutting can be employed, such as with a transverse cutter assembly for transversely separating the dough strips into dough pieces, with the transverse cutter assembly operatively supported with respect to the conveying surface downstream from the first cutter assembly. In particular, the transverse cutter assembly can comprise at least one transverse cutting element that includes a blunt edge cutter that is defined by a transverse dough engaging curved surface, with the transverse dough engaging curved surface having a radius so that the first skin of a respective dough strip will be drawn to and pinched together with the second skin of the respective dough strip as the respective dough strip is moved past the transverse cutter assembly to create the dough pieces. For instance, the transverse cutter assembly can comprise a guillotine-type cutter having a controlled movement to cut the dough pieces during intermittent stoppages of the conveyor.

Figure 9A:
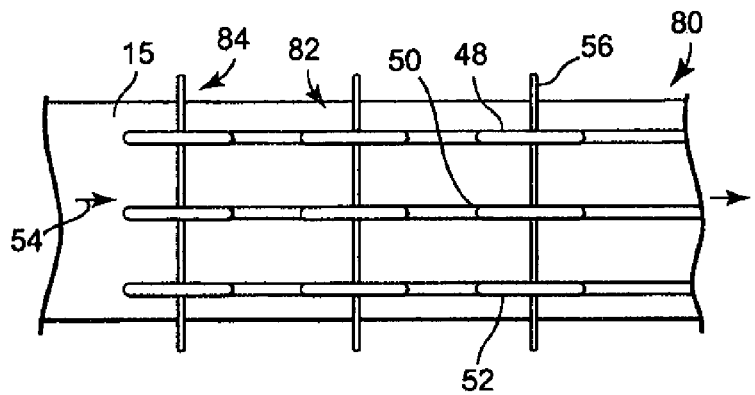
FIGS. 9A and 9B illustrate another embodiment of a dough cutter in accordance with one aspect of the present invention.
Figure 9B:
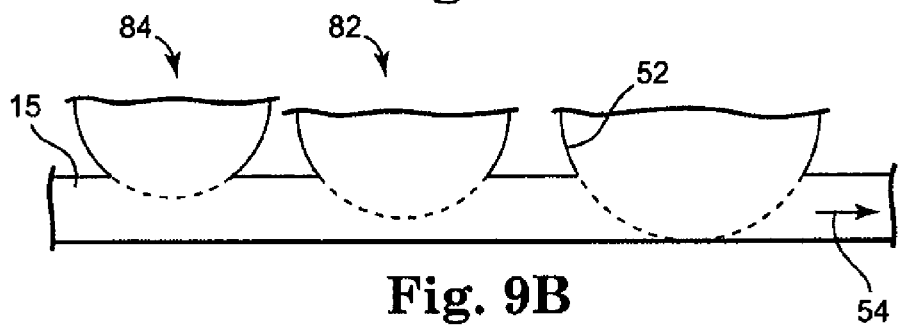

Therefore, FIGS. 9A and 9B illustrate a system 80 for cutting a thicker sheet of dough 15. System 80 is similar to system 38 illustrated in FIG. 7A, and similar items are similarly numbered. However, system 80 also includes two additional sets 82 and 84 of rotatable wheel cutters, which are generally aligned with, and located upstream of, wheel cutters 48, 50 and 52. The sets 82 and 84 of wheel cutters are similar to wheel cutters 48, 50 and 52, except that they are each set to depress into dough sheet 15 at different depths. FIG. 9B is a side view illustrating the different depths of cutting or depression.

FIG. 9B illustrates that the set of rotatable wheel cutters 84 only make a small depression into the surface of dough sheet 15. This depression does not break the skin on the surface of dough sheet 15, but only acts to locally stretch the skin toward the conveyor, in the area of the depression. The second set of rotatable wheel cutters 82, which is located downstream of set 84, depresses somewhat further into dough sheet 15, but still does not sever dough sheet 15. The set of cutters illustrated in FIG. 9A, which includes wheel 52, on the other hand, extends all the way into, and severs, dough sheet 15, thus completing the cut. In this way, relatively thick dough sheets can be cut using rotatable wheel cutters, without positively driving the wheels, and without encountering a significant build up or gathering of dough upstream of the roller wheel cutters. Of course, the sets of wheel cutters 82 and 84 can have any of the configurations illustrated in FIGS. 8A-8G. Depending on their purpose, the cutters can also be implemented as illustrated in FIG. 8H. Similarly, more or fewer sets of wheel cutters can be used based on a particular dough thickness and line speed. Further, different cutter wheel thicknesses may be used at different locations relative to the dough sheet.

In some applications, it has been found desirable to be able to form a plurality of buns or loaves which are distinct from one another, but which are still attached to one another, in groups. Such buns can be ganged together in any desired number. For example, in order to package hot dog buns, it may be desirable to maintain four buns, physically connected to one another, yet discrete, such that they can be inserted in two layers into a bag or other package, to provide the consumer with eight hot dog buns. Such ganged buns or loaves can also be used in other applications.

Figure 10A:
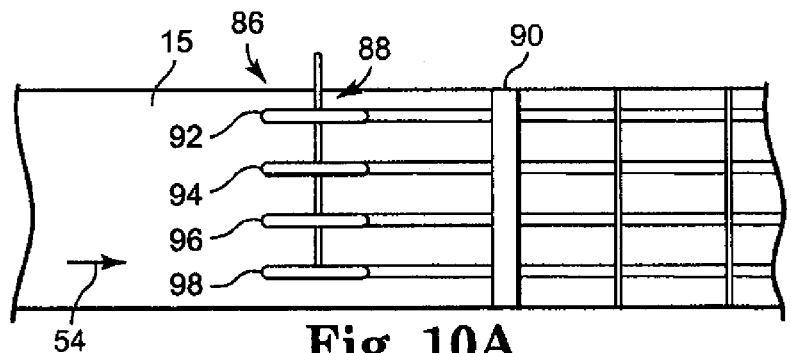
Figure 10B:
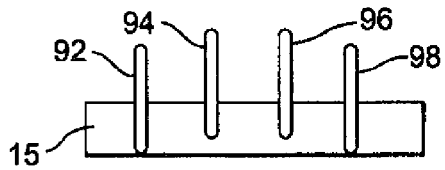

FIGS. 10A-10B illustrate a system 86 for forming buns or loaves in such a ganged fashion. System 86 shows dough sheet 15 moving in a direction 54, as indicated in previous figures. Similarly, system 86 includes a set 88 of rotatable wheel cutters and a guillotine-type cutter 90 located downstream of the set 88 of rotatable wheel cutters. The set 88 of rotatable wheel cutters includes cutters 92, 94, 96, and 98, all of which at least depress into dough sheet 15 and locally stretch the skin of one surface of dough sheet 15 toward the opposite skin. However, in order to achieve ganged buns or loaves, wheels 94 and 96 do not cut all the way through dough sheet 15, but instead stop just short of severing dough sheet 15.

This is indicated in greater detail in FIG. 10B. It can be seen that rotatable cutters 92 and 98 are positioned relative to the conveyor conveying dough sheet 15 to sever dough sheet 15, while cutters 94 and 96 are not. Therefore, as dough sheet 15 passes the set 88 of cutters, four depressions are made, only two of which sever dough sheet 15. The dough then travels to guillotine-type cutter 90 which makes a transverse cut, periodically, in dough sheet 15 such that the cut dough pieces are the desired length such as the length of hot dog buns. It should be noted that guillotine-type cutter 90 can be a blunt edge cutter in accordance with the present invention as well. Further, as illustrated in FIG. 10E, which is a bottom view of cutter 90, cutter 90 can include a generally rounded shape to cut the dough sheet 16 into loaves or buns having rounded ends.

Figure 10C:
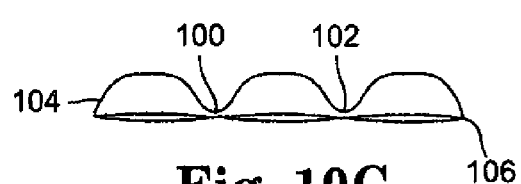
Figure 10D:
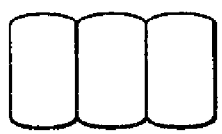

The resulting product is illustrated in FIG. 10C. FIG. 10C illustrates depressions 100 and 102 which are formed by cutters 94 and 96. The outer edges 104 and 106 of the buns, however, have been severed from the remainder of dough sheet 15. This yields a product, the top view of which is illustrated in FIG. 10D, which has three buns, physically connected to one another, yet distinct from one another. Also, cutters 94 and 96 can be implemented using perforating cutter 48 illustrated in FIG. 8H, so the discrete buns can be separated more easily. While system 86 shows rotatable wheel cutters 88 for forming a ganged set of buns as illustrated in FIG. 10D, the ganged buns could also be formed utilizing a reciprocating cutting head, cutters disposed on a rotatable drum, or a walking head cutter, as discussed in greater detail later in the application.

FIG. 11A illustrates another cutter 108 in accordance with one aspect of the present invention. Cutter 108 is formed of a plurality of structures, or cells 110, each of which is similar to cutters 16 or 31, illustrated in previous figures. However, rather than having an inner periphery which is shaped the same as the outer periphery, each of the cells 110 has an outer periphery which is shaped as a geometric figure which can be nested with other similarly shaped cells so as to avoid waste (e.g., squares, triangles, pentagons, hexagons, etc.), with an inner periphery having a different shape (although it could also be the same shape), such as a circle or oval, etc. In one preferred embodiment, the outer periphery of each of the cells or structures 110 is provided with a cutting edge, similar to cutting edge 32 illustrated in FIG. 6A. The inner periphery is provided with a blunt edge dough engaging portion such as portion 34 illustrated in FIG. 6A. In this way, a dough sheet traveling beneath cutter 108 will be substantially completely used, without trim (other than trim at the lateral edges of the dough sheet), since the geometric figures (e.g., hexagons) defining the outer peripheries of each of the cells 110 nest with the geometric figures defining the outer periphery of adjacent cells 110. However, since the inner periphery is a blunt dough engaging portion, each of the rolls or bread products cut by cutter 108 have rounded edges, rather than squared off, or sharply cut edges.

In an illustrative embodiment, a dough sheet is passed along cutter 108 in the direction indicated by arrow 112. Cutter 108 is mounted on a reciprocating cutter (such as that described in greater detail with, respect to FIG. 12 or 13). In accordance with one aspect of the present invention, cutter 108 is provided with leading protrusions 114, and trailing protrusions 116. Since the inner periphery of cutting cells 110 is blunt, it has been observed that dough sheet 15, when traveling in the direction indicated by arrow 112 under reciprocating cutter 108, can leave narrow trailing dough tails. However, by providing the leading and trailing protrusions 114 and 116, the tails are substantially eliminated thus rendering the cut dough product more suitable for packaging, with less waste.

FIG. 11B illustrates an additional feature. It may be desirable to imprint the top of the dough pieces with a pattern (such as a Kaiser pattern, a cross, a cloverleaf, etc.). Such an imprinter is illustrated generally at 109 in FIG. 11B.

Imprinter 109 is shown attached to cutter 108 (described with respect to FIG. 11A) on a reciprocating, or walking head-type cutter. Cutter 108 is attached to pattern imprinter 109 by a back plate 111, or another suitable attachment mechanism. As the dough moves past cutter 108 in the direction indicated by arrow 112, the dough is cut into pieces by each of the cells 110 of cutter 108. The cut dough pieces then progress further in the direction indicated by arrow 112, until they are beneath imprinter section 109. The reciprocating head which contains cutter 108 and imprinter 109 is then again lowered on the dough. Patterns 113 are positioned on back plate 111 such that, when the dough is moved by a predefined amount, the pieces cut by cells 110 of cutter 108 are precisely located beneath patterns 113, which protrude from plate 111. When the cutting head is again reciprocated downwardly toward the dough sheet, patterns 113 impinge on the top of the dough pieces and thus imprint the desired pattern thereon. Of course, the amount by which patterns 113 project from backing plate 111 will determine the depth to which the patterns are imprinted on the surface of the cut dough pieces. Any desirable depth can be chosen.

FIG. 11C illustrates cutter 108 formed as a cutter bar, used in conjunction with a compression roller 118. Such an arrangement, with traditional sharp edge hex cutters, is known and is described in greater detail in U.S. Pat. No. 5,535,575. Briefly, dough sheet 15 travels in the direction illustrated by arrow 54, above cutter bar 108, which is formed as a continuous cutting unit conveyed by a conveyor. As dough sheet 15 engages compression roller 118, roller 118 compresses dough sheet 15 down into cutter 108. Downstream of compression roller 118, the dough pieces within each of the cells 110 of cutter 108 are removed and packaged.

Figure 12:
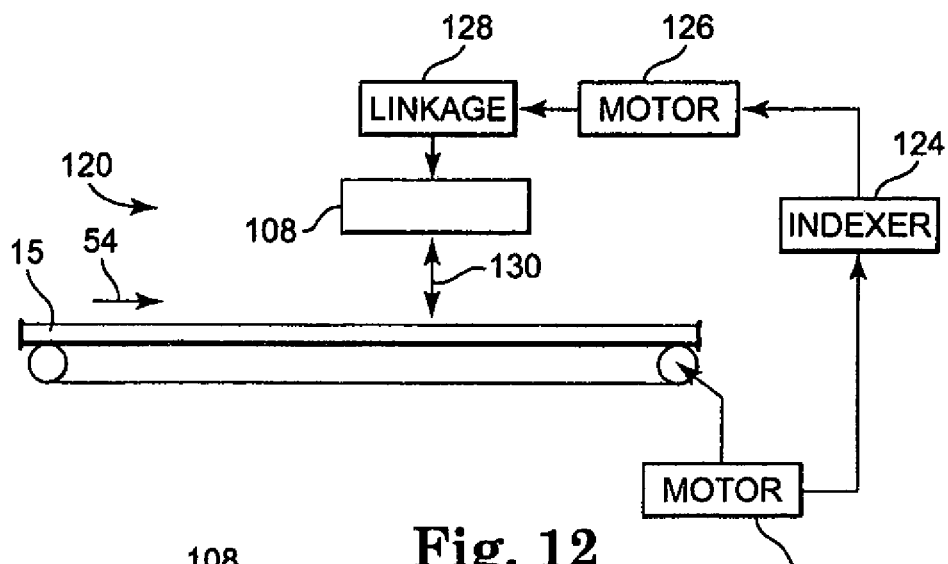
FIG. 12 illustrates a reciprocating head cutter in accordance with one aspect of the present invention.

FIG. 12 illustrates a system 120 for illustrating cutter 108 on a reciprocating head cutter. System 120, as with previous systems described herein, includes dough sheet 15 moving in the direction indicated by arrow 54, as conveyed by a conveyor. The conveyor is driven by a motor 122 which is coupled by an index controller (which can be an electronic controller or a mechanical linkage) to a motor 126 which is coupled, through linkage 128, to head 108. Motor 126 can be an electrical motor or any other suitable type of motor such as a linear motor with hydraulic or pneumatic actuators. As dough sheet 15 is moved in the direction indicated by arrow 54, head 108 is moved in a reciprocal fashion indicated by arrow 130, to cut dough sheet 15 into desired products. Reciprocating head cutters are well known.

Figure 13:
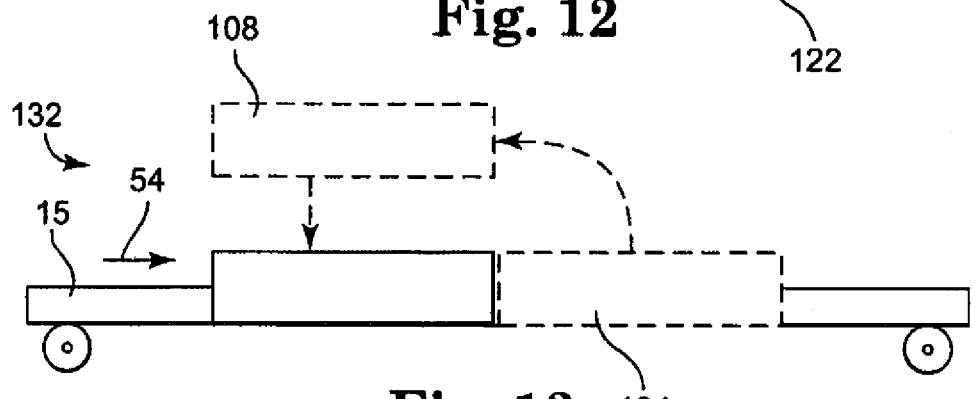
FIG. 13 illustrates a walking head cutter in accordance with one aspect of the present invention.

FIG. 13 illustrates another system in which cutter 108, or a similar cutter, can be used. In FIG. 13, system 132, employs a walking head cutter arrangement in which cutter 108, reciprocates relative to dough sheet 15 not only in a vertical direction, but also in a horizontal direction. In other words, cutter 108 is pressed downwardly into dough sheet 15, as dough sheet 15 moves in the direction indicated by arrow 54. Cutter 108 thus cuts dough sheet 15 in the desired pattern. Cutter 108 is configured to move along with dough sheet 15 in the direction indicated by arrow 54 for a predetermined distance to the position indicated in phantom at 134 in FIG. 13. Then, cutter 108 is withdrawn from dough sheet 15 upwardly and rearwardly relative to the travel path 54 of dough sheet 15. Cutter 108 is then depressed down into dough sheet 15 again, and again "walks" along with dough sheet 15.

Figure 14A:
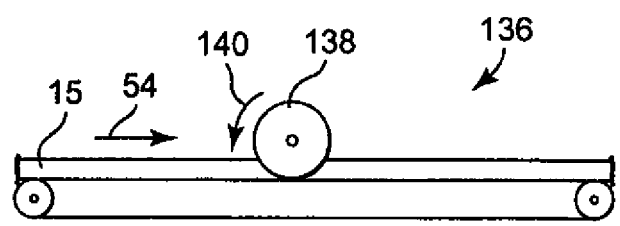
FIGS. 14A and 14B illustrate a rotary drum cutter in accordance with one aspect of the present invention.
Figure 14B:
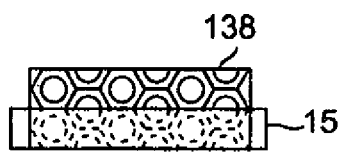

FIGS. 14A and 14B illustrate yet another system 136 in accordance with one aspect of the present invention. In system 136, a rotary drum cutter 138 is provided with cutter 108 disposed on its exterior surface. As with reciprocating head cutters, and walking head cutters, rotary drum cutters are also well known. Briefly, as dough sheet 15 moves in the direction indicated by arrow 54, rotary drum cutter 138 rotates in the direction indicated by arrow 140. With cutter 108 disposed on its exterior surface, rotary drum 138 performs desired cutting operations to cut dough sheet 15 into a desired number of pieces.

Thus, it can be seen that the present invention provides a number of significant advantages over prior art dough cutters. The present invention provides a blunt dough cutting or dough engaging surface which is configured to pull a first surface of the dough toward a second surface of the dough, when the cutter is impinged on the dough sheet. This tends to seal the two surfaces of dough together, and also, when desired, severs the dough sheet. This results in a dough product which more closely resembles a hand formed dough product, with rounded edges, rather than straight or sharply angled edges. Since the present invention can be implemented on substantially any suitable cutting apparatus, or in any suitable cutting system, the present invention can achieve a high throughput while still maintaining its advantages.

Although the present invention has been described with reference to preferred embodiments, workers skilled in the art will recognize that changes may be made in form and detail without departing from the spirit and scope of the invention.

What is claimed is:

1. A dough forming and cutting apparatus for shaping and cutting a dough sheet having a first surface with a first skin and a second surface with a second skin, the apparatus comprising:

a conveyor having a conveying surface defined by a belt onto which a dough sheet is to be supplied and for moving the dough sheet in a dough travel direction;

a first cutter assembly operatively supported relative to the conveying surface and comprising at least one dough cutting wheel that is rotationally supported on a support axle, the at least one dough cutting wheel being positionable by the support axle so as to engage against and be able to roll along the conveying surface to cut the dough sheet into strips of dough that each are defined with a, width across the dough travel direction created by an axial spacing of the at least one dough cutting wheel along the support axle, wherein the at least one dough cutting wheel comprises a blunt dough cutting portion that radially extends around the at least one dough cutting wheel so as to provide a cutting action as dough is moved in the dough travel direction, the blunt dough cutting portion defined by a cutting edge and dough engaging curved surfaces on both sides of an outer circumference of the at least one dough cutting wheel, each dough engaging curved surface having a radius so that the first skin of the dough sheet will be drawn to and pinched together with the second skin of the dough sheet as the dough sheet is moved past the first cutter assembly to create the dough strips, wherein the at least one dough cutting wheel further includes a dough engaging surface portion at a central outer circumference thereof that is radially offset from the dough engaging curved surfaces that are provided to both sides thereof so as to cut the first and second skins of the dough sheet as pinched together by the dough engaging curved surfaces and wherein the dough engaging surface portion at the central outer circumference is radially offset by an amount that is no more than one half of the radius for each of the dough engaging curved surfaces; and a transverse cutter assembly for transversely separating the dough strips into dough pieces, the transverse cutter assembly operatively supported with respect to the conveying surface downstream from the first cutter assembly, wherein the transverse cutter assembly comprises at least one transverse cutting element that includes a blunt edge cutter that is defined by a transverse dough engaging curved surface, the transverse dough engaging curved surface having a radius so that the first skin of a respective dough strip will be drawn to and pinched together with the second skin of the respective dough strip as the respective dough strip is moved past the transverse cutter assembly to create the dough pieces.

2. The dough forming and cutting apparatus of claim 1, wherein a plurality of dough cutting wheels are rotationally supported on the support axle and are spaced relative to one another along the support axle to create a plurality of similar dough strips.

3. The dough forming and cutting apparatus of claim 1, wherein the radius for each of the dough engaging curved surfaces is at least 0.125 of an inch.

4. The dough forming and cutting apparatus of claim 1, wherein the transverse cutter assembly comprises a guillotine-type cutter having a controlled movement to cut the dough pieces during intermittent stoppages of the conveyor.

5. The dough forming and cutting apparatus of claim 1, wherein the first cutter assembly is movably supported relatively to the conveyor surface so that a depth of penetration into the dough sheet by the dough cutting wheel can be changed.

6. A dough forming and cutting apparatus for shaping and cutting a dough sheet having a first surface with a first skin and a second surface with a second skin, the apparatus comprising:

a conveyor having a conveying surface defined by a belt onto which a dough sheet is to be supplied and for moving the dough sheet in a dough travel direction;

a first cutter assembly operatively supported relative to the conveying surface and comprising a plurality of dough cutting wheels that are rotationally supported on a support axle, the dough cutting wheels each being positionable by the support axle so as to engage against and be able to roll along the conveying surface to cut the dough sheet into strips of dough that each is defined with a width across the dough travel direction created by an axial spacing of each of the dough cutting wheels along the support axle;

wherein each of the dough cutting wheels comprises a blunt dough cutting portion that radially extends around each of the dough cutting wheels so as to provide a cutting action as the dough sheet is moved in the dough travel direction each blunt dough cutting portion being defined by a cutting edge and dough engaging curved surfaces to the sides of a central outer circumference of the dough cutting wheel, each of the dough engaging curved surfaces having a radius so that the first skin of the dough sheet will be drawn to and pinched together with the second skin of the dough sheet as the dough sheet is moved past the first cutter assembly to create the dough strips, wherein each of the dough cutting wheels further includes a dough engaging surface portion at the central outer circumference thereof that is radially offset from the dough engaging curved surfaces that are provided to both sides thereof so as to cut the first and second skins as pinched together by the dough engaging curved surfaces, and wherein the dough engaging surface portion at the central outer circumference is radially offset by an amount that is no more than one half of the radius for each of the dough engaging curved surfaces.

7. The dough forming and cutting apparatus of claim 6, wherein the plurality of dough cutting wheels are rotationally supported on the support axle and are spaced relative to one another along the support axle to create a plurality of similar dough strips.

8. The dough forming and cutting apparatus of claim 6, wherein the radius of the dough engaging curved surfaces is at least 0.125 of an inch.

9. The dough forming and cutting apparatus of claim 6, wherein the first cutter assembly is movably supported relatively to the conveyor surface so that a depth of penetration into the dough sheet by the dough cutting wheels can be changed.

10. The dough forming and cutting apparatus of claim 6, further comprising a second cutter assembly that is operatively supported relative to the conveying surface and comprising at least one second dough cutting wheel that is rotationally supported on a second support axle and that is positioned by the second support axle so as to be spaced from the conveying surface to only partially depress and shape the dough sheet, the at least one second dough cutting wheel comprising a blunt edge that is defined by a second dough engaging curved surface on at least one side of a second central outer circumference of the at least one second dough cutting wheel, the second dough engaging curved surface having a radius so that the first skin of the dough sheet will be drawn toward the second skin of the dough sheet.

11. The dough forming and cutting apparatus of claim 10, wherein the second cutter assembly is positioned upstream of the first cutter assembly with the at least one second dough cutting wheel thereof positioned at an upstream position of the dough cutting wheels of the first cutter assembly.

* * * * *